TAPE SENSING DEVICE

Original Filed May 8, 1961 4 Sheets-Sheet 1

INVENTORS
SHELDON LEE PASTOR
CARL W. CLARAS
RUDOLPH A. ROM
BY
Carpenter Abbott Coulter & Kinney
ATTORNEYS

TAPE SENSING DEVICE

Original Filed May 8, 1961 4 Sheets-Sheet 2

INVENTORS
SHELDON LEE PASTOR
CARL W. CLARAS
RUDOLPH A. ROM

BY
Carpenter Abbott Coulter and Kinney
ATTORNEYS

TAPE SENSING DEVICE

Original Filed May 8, 1961 4 Sheets-Sheet 3

INVENTORS
SHELDON LEE PASTOR
CARL W. CLARAS
RUDOLPH A. ROM
BY
Carpenter Abbott Coulter and Kinney
ATTORNEYS Nov. 30, 1965 S. L. PASTOR ETAL 3,220,659

TAPE SENSING DEVICE

Original Filed May 8, 1961 4 Sheets-Sheet 4

INVENTORS
SHELDON LEE PASTOR
CARL W. CLARAS
RUDOLPH A. ROM

BY

Carpenter Abbott Coulter & Kinney
ATTORNEYS 3,220,659
TAPE SENSING DEVICE

Sheldon Lee Pastor, St. Paul, Minn., and Carl W. Claras, Western Springs, and Rudolph A. Rom, Naperville, Ill., assignors to Minnesota Mining and Manufacturing Company, St. Paul, Minn., a corporation of Delaware Original application May 8, 1961, Ser. No. 108,352, now Patent No. 3,149,797, dated Sept. 22, 1964. Divided and this application July 13, 1964, Ser. No. 382,322
6 Claims. (Cl. 242—55.13)

This invention relates to improvements in self-threading magnetic tape recording and reproducing apparatus, and more particularly relates to a sensing mechanism which is capable of automatically indicating completion of the "rewind" operation of the apparatus.

This application is a division of application Serial No. 108,352, filed May 8, 1961, now Patent No. 3,149,797, for Self-Treading Magnetic Tape Recording and Reproducing Apparatus.

The present invention provides a novel sensing means for an improved automatic recorder-reproducer which utilizes a relatively stiff leader to thread the recording tape into said recorder-reproducer. The sensing means, being cooperable with the leader during a rewind operation and taking advantage of the fact that the leader has a greater transverse dimension than the limp magnetic tape to which it is attached, is operable to permit free travel of the tape therepast, but to frictionally engage the leader and to be moved by said engagement through a distance to do effective work during a rewind operation.

While the inventive concept has particular utility in the field of magnetic recording, the broader aspects of the invention are not so limited, it being obvious that various features thereof have substantial utility in other fields.

Advantages of the present invention other than aforestated will become apparent as the description proceeds, reference being had to the drawings accompanying and forming a part of this specification, wherein.

Figure 1:
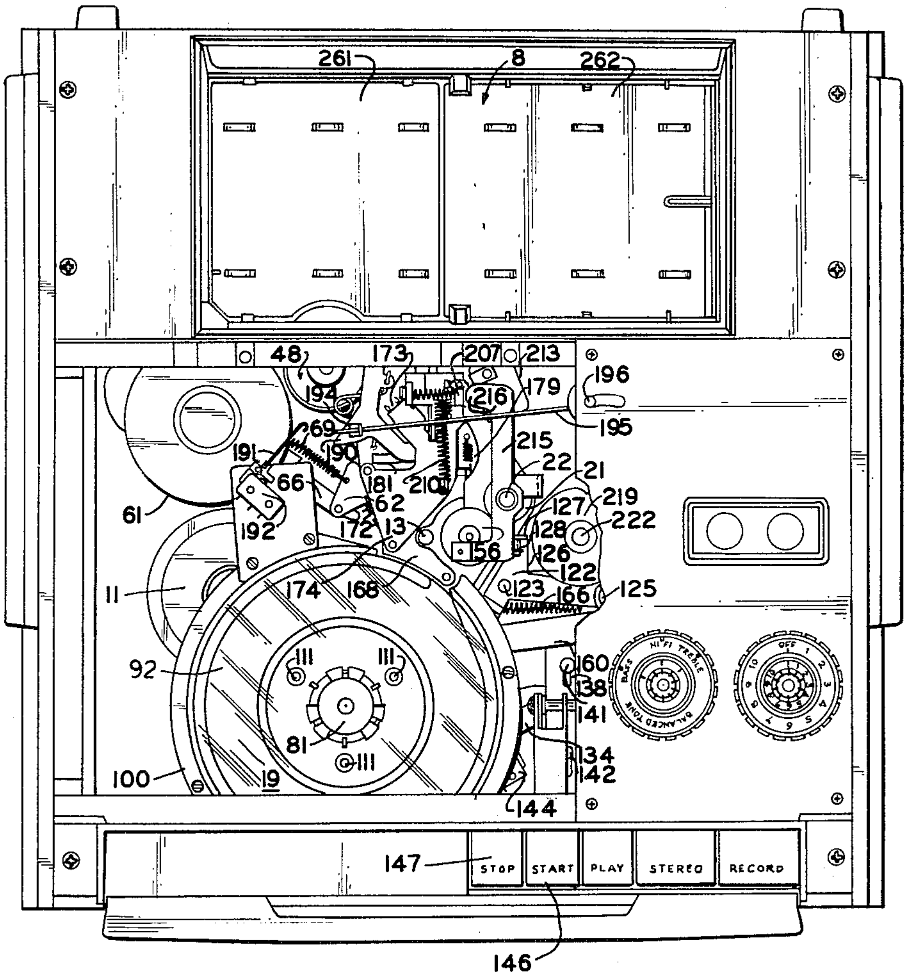
FIGURE 1 is a plan view of the improved magnetic tape recorder-reproducer with one cover plate section removed to expose the parts therebelow.
Figure 2:
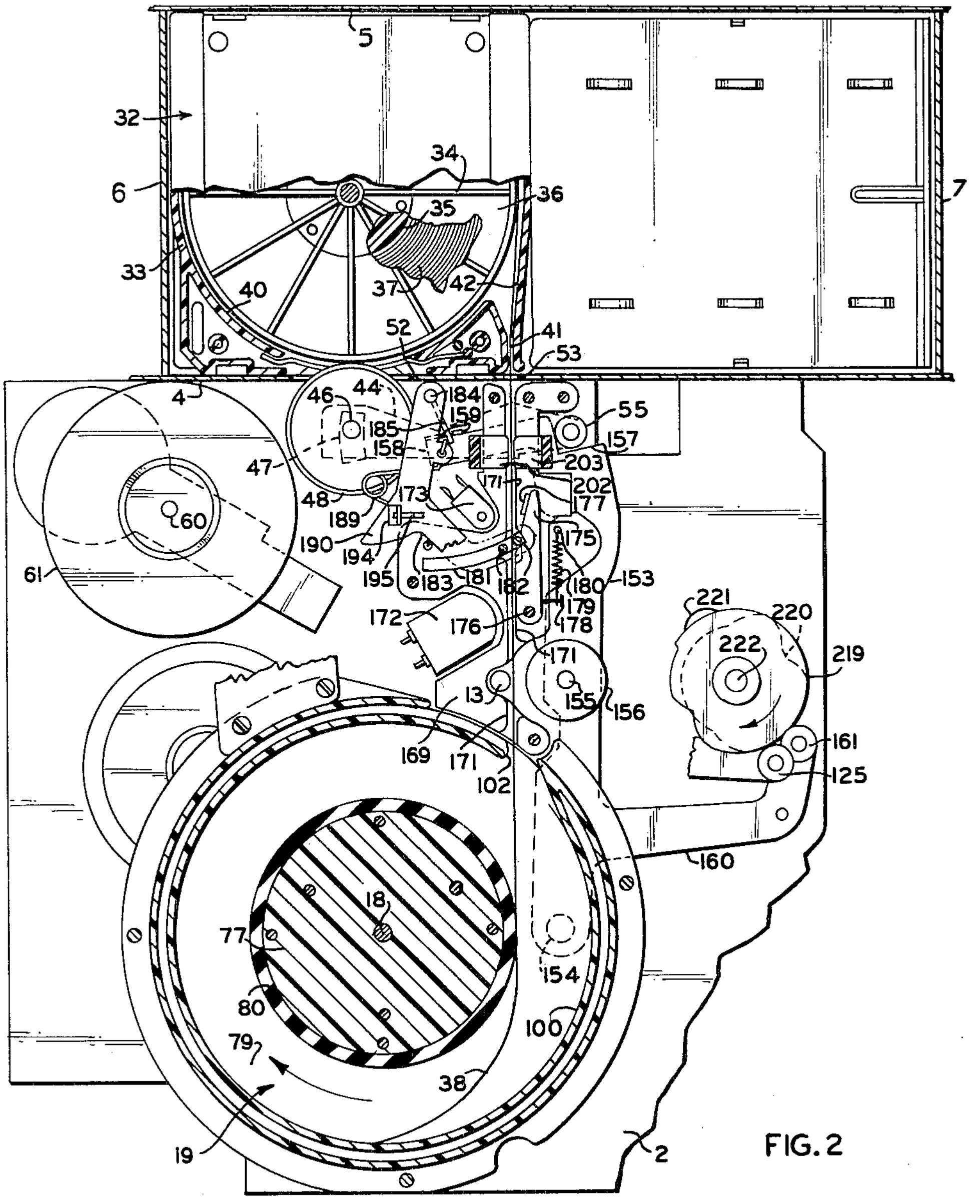
FIGURE 2 is a fragmentary sectional plan view taken generally in the plane of the tape path and as indicated by the line II—II of FIGURE 5, the parts being shown in the position assumed thereby during threading of the leader and tape.

Referring more particularly to FIGURE 1 of the drawing, it will be observed that the improved recorder-reproducer comprises a generally rectangular box-like case which removably encloses a chassis on which the component parts of the invention are mounted. The chassis comprises an upper deck 2 and a lower deck (not shown) vertically spaced therefrom. As shown in FIGURE 2, the chassis includes at the rear thereof spaced parallel vertical plate or wall members 4 and 5 joined by spaced parallel vertical wall members 6 and 7 to provide a rectangular well forming part of a cartridge storage and changer mechanism indicated generally by the numeral 8. The improved recorder-reproducer also includes an amplifier and a pair of speakers, neither of which will be shown or described and which may be of any suitable construction.

Figure 3:
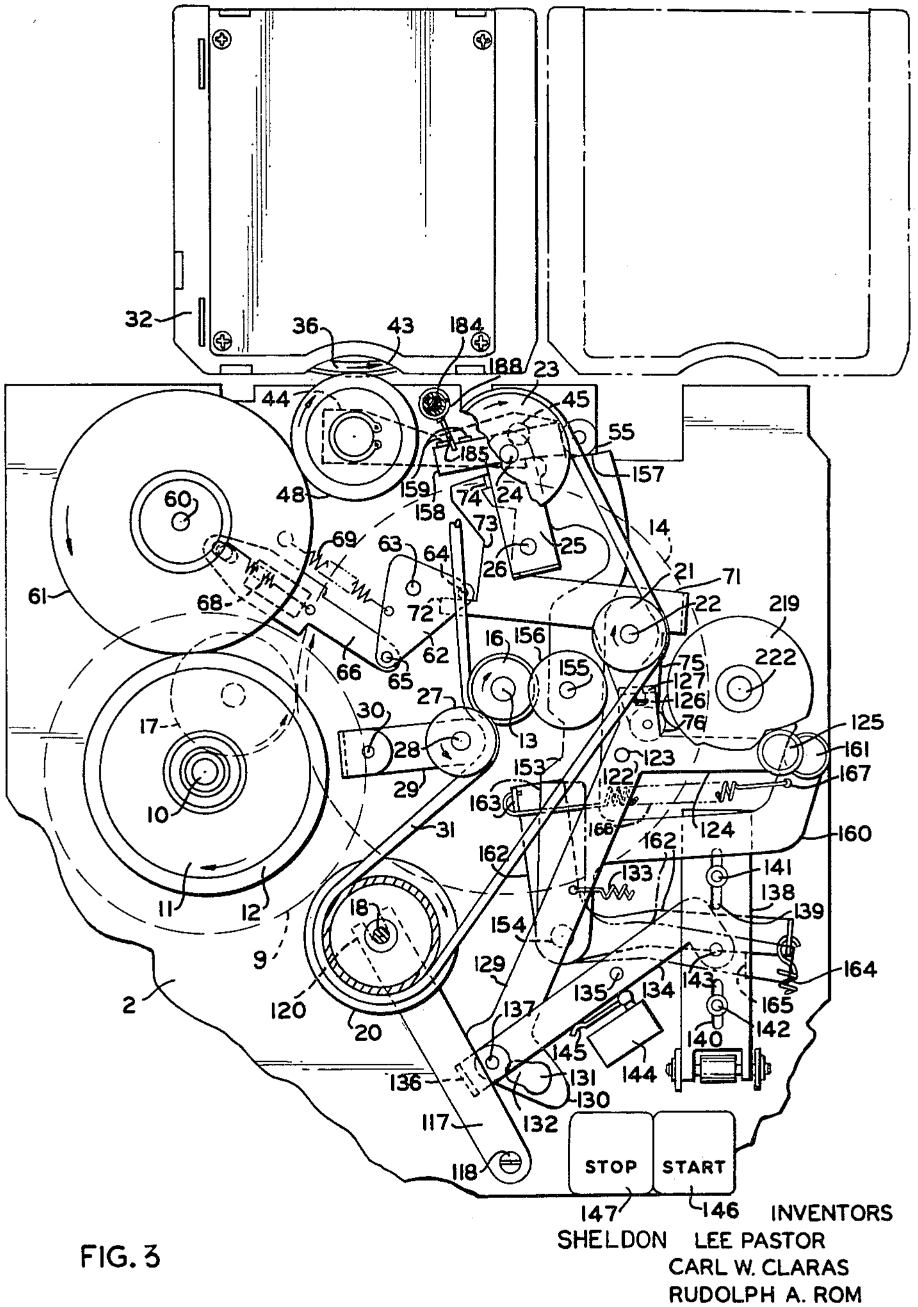
FIGURE 3 is a fragmentary sectional plan view taken generally below the plane of the cartridge and takeup reel showing the parts in "rewind" position.

Power for operation of the mechanism of the improved recorder-reproducer is derived from an electrical motor 9 (see FIGURE 3) supported by the lower deck and having an upstanding drive shaft 10. As shown in FIGURE 3, the drive shaft 10 projects through the upper deck 2 and carries at its upper end a drive wheel 11, preferably having a rubber-like peripheral ring 12. Mounted in suitable bearings in the upper and lower decks is a capstan shaft 13 which projects above the deck 2 and has a fly wheel 14 fixed thereon between said decks as shown in FIGURE 3. Above the deck 2 the shaft 13 has a belt drive pulley 16 (FIGURE 3) fixed thereon. A suitably mounted idler drive wheel 17 affords continuous driving engagement between the motor drive shaft 10 and the fly wheel 14 to afford continuous clockwise rotation of the fly wheel 14, capstan shaft 13 and belt drive pulley 16 whenever the motor 9 is operating.

As shown in FIGURES 2 and 3, a vertical shaft 18, mounted in suitable bearings, projects above deck 2 and has a takeup reel 19 fixed to the upper end thereof. A clutch pulley 20 is freely rotatable on the shaft 18 below the takeup reel 19 and is associated with the takeup reel through a clutch mechanism. A pulley 21 is freely rotatable on a vertical shaft 22, and a pulley 23 is freely rotatable on a stub shaft 24 carried by an arm 25 pivotally mounted on a vertical shaft 26. A pulley 27 is freely rotatable on a stub shaft 28 carried by an arm 29 pivotally mounted on a vertical shaft 30. An endless belt 31, for example of rubber-like material and of circular cross section, is trained around the pulleys 20, 21, 23, 16 and 27 as shown, so that clockwise rotation of the capstan 13 produces clockwise rotation of pulleys 20, 21 and 23, and counterclockwise rotation of the pulley 27.

The changer mechanism 8 is adapted to accommodate a cartridge 32 (FIGURES 2 and 3) in "play" position therein. The cartridge 32 comprises a shallow rectangular container 33, for example of plastic, within which a supply reel 34 is rotatably mounted. When the cartridge 32 is in "play" position, the supply reel 34 is disposed in the same horizontal plane as the takeup reel 19. The supply reel 34, illustrated in FIGURE 2, comprises a central hub portion 35 and spaced circular side flanges 36.

Figure 8:
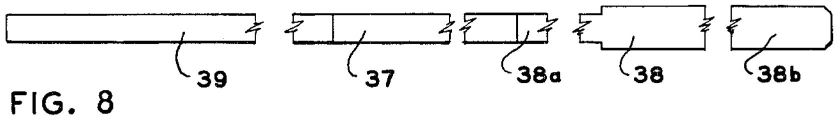
FIGURE 8 is a fragmentary elevational view of an extent of magnetic tape showing a leader attached to one end and a trailer attached to the other end.

Referring to FIGURE 8, a relatively limp magnetic tape 37 has a relatively stiff flexible normally straight leader 38 having a trailing end **38*a* of the same width as the tape 37. Major portion 38*b* of the leader 38 has a width greater than the spacing between the reel flanges 36. A trailer 39 is attached to the other end of the tape 37 and has a width substantially the same as that of said tape. The trailer 39 is stiffer than the said tape 37 but may be somewhat more flexible than the stiff normally straight leader. The free end of the trailer 39 is fixedly attached to the hub 35 of the reel 34, and said trailer, together with the tape 37 and the portion 38*a* of the leader is wound on the hub 35 between the flanges 36. The portion 38*b* of the leader, due to its greater width, is wound on the peripheries of the flanges 36 when the cartridge 32** is not in use.

An example of one type of magnetic recording tape which is satisfactory for use in the improved apparatus is one in which the backing or carrier film takes the form of tensilized polyethylene terephthalate .005 inch thick and .150 inch wide. The leader 38 may be made of polyethylene terephthalate .0101 inch thick, the portion 38*a* being .150 inch wide and the portion 38*b* being .238 inch wide.

A lever 44 is mounted between the upper and lower decks for pivotal movement on a shaft 45 depending from the deck 2 (FIGURE 3). The lever 44 carries at one end a vertical shaft 46 which projects upwardly through a slot 47 (FIGURE 2) in the upper deck 2 and carries on its upper end a freely rotatable drive-out rewind roller 48. As shown in FIGURE 2, the wall 4 of the chassis is formed with an opening 52 and with an opening 53. When a cartridge 32 is in "play" position, an opening 41 therein is in registry with the wall opening 53, and the flanges 36 of the reel 34 thereof are disposed for engagement with the drive-out-rewind roller 48. The lever 44 affords a swingable mounting for the drive-out-rewind roller 48, said roller being movable from the retracted or inoperative position thereof shown in FIGURE 1, to the advanced or operative position thereof shown in FIGURES 2 and 3, wherein the roller engages the leader 38 wound on the periphery of the reel flanges 36 to push the leader out of the cartridge 32 and along a predetermined path to the takeup reel 19 as shown in FIGURE 2 during a threading operation and to engage the peripheries of the flanges 36 during a rewind operation as will hereinafter appear.

Means is provided for effecting engagement of a forward drive or counterclockwise rotational movement for the drive-out-rewind roller 48, disengagement of all drive for said roller or engagement of the rewind drive for said roller as shown in FIGURE 3. To this end, an irregularly shaped stamping 71 is mounted for pivotal movement above the deck 2 about the axis of the pulley shaft 22. The stamping 71 has a projection 72 for coaction with the depending pin 64 on plate 62, and it also has a laterally projecting arm 73 formed with an upstanding lug 74 (FIGURE 3) for coaction with the arm 25 which supports the belt pulley 23. The stamping 71 has three operative positions. In the intermediate position thereof the upstanding lug 74 engages the arm 25 to hold the belt 31 out of driving engagement with the roller 48. At the same time, the bias of the spring 69 holds a rewind idler 61 out of engagement with the drive-out-rewind roller 48 through a plate 62 and link 66. In the forward "drive-out" or "thread" position of the member 71 the upstanding lug 74 has been withdrawn from the arm 25 sufficiently to permit engagement of the belt 31 with the drive-out-rewind roller 48 for counterclockwise rotation of the latter. At the same time, the action of the spring 69 holds the rewind idler 61 out of engagement with the rollers 11 and 48.

The "rewind" position of the member 71 is shown in FIGURE 3. In this position the upstanding lug 74 engages the arm 25 and holds the latter in a position wherein the belt 31 is spaced substantially from the drive-out-rewind roller 48. At the same time, the projection 72 has engaged the depending pin 64 on plate 62 and rotated said plate counterclockwise against the bias of the spring 69, such movement being effective through the link 66 and spring 68 to pull the rewind idler 61 into driving engagement with both the drive roller 11 and the drive-out-rewind roller 48 to thereby cause clockwise rotation of the latter. The stamping 71 is formed with a laterally projecting arm 75 which carries a cam following roller 76 through which the disposition of the stamping 71 is controlled as will hereinafter appear.

The takeup reel 19 comprises a hub portion 77, a lower circular flange 79 and an annular member 80 of rubber-like material which snugly surrounds the said hub as shown in FIGURE 2. A circular side flange 92, for example of clear plastic, overlies the hub 77 and is formed with suitable openings and cutout portions to hold it in registry with the hub 77 and yet permit axial movement relative thereto against the bias of a spring, not shown. An arcuate preferably circular deflecting and retaining member 100 is suitably mounted relative to the flanges 79 and 92 to dispose its cylindrical inner surface in spaced relation between the peripheral portions of the flanges 79 and 92 and coaxial therewith. As shown in FIGURE 2, the member 100 is formed with an opening 102 for passage therethrough of the leader and tape.

The takeup reel 19 is provided with a suitable dual torque clutch mechanism which will provide a low torque driving connection between the pulley 20, the driving member of the clutch mechanism, and the takeup reel 19, a high torque driving connection or no rotative force. The low torque driving connection aforementioned applies a rotating force to the takeup reel 19 which is less than that which can deleteriously stress the magnetic tape 37.

A clutch actuating lever 117, as shown most clearly in FIGURE 3, has one end apertured to receive a screw 118 threaded into the deck 2, there being a helical spring surrounding the screw 118 and holding the adjacent end of the lever 117 elevated against the head of said screw and spaced above the deck 2. The other end of the lever 117 is bifurcated as at 120, said bifurcated end embracing the shaft 18 and engaging the floating pulley 20. The lever 117 has a downwardly offset portion 121 engagement of which with the deck 2 defines the lowermost, disengaged or "off" position of the drive pulley 20. Means is provided for actuating the clutch lever 117, and to this end a three-armed lever 122, pivoted on a pin 123, is provided which on one arm 124 carries a cam following roller 125.

A generally L-shaped lever 134 is pivotally mounted on a vertical pin 135 and terminates at one end in a rounded, upturned flange 136 which engages the underside of the clutch actuating lever 117. A lever arm 129 of the lever 122 is provided with an enlarged end portion 130. A downwardly offset circular portion 137 formed on the lever 134 is disposed adjacent the end portion 130 and is adapted to engage the upper surface of the end portion 130 as well as the upper surfaces of upwardly offset portions 132 and 131 of the arm 129, to provide, when engaged with said surfaces respectively, the "off," the "low torque" and the "high torque" positions of the lever 117 and clutch drive pulley 20.

The other end of the lever 134 is pivotally connected, as by pin 143, to a slide bar 138 which is slotted as at 139 and 140 to receive fixed guide pins 141 and 142. The slide bar 138 is movable longitudinally between a "start" position and a "stop" position to thereby effect movement of the lever 134 which in turn actuates a normally open switch 144. In the "start" position shown in FIGURE 3 the contacts of the switch are closed.

Referring to FIGURES 2 and 3, an irregularly shaped arm 153 is pivotally mounted at one end on a fixed pin 154, and intermediate its length said arm carries an upstanding stub shaft 155 on which a pressure roller 156 of rubber-like material is freely rotatable, said roller being cooperable with the capstan 13. The arm 153 has an end surface 157 cooperable with a roller 55 and, as best shown in FIGURE 3, said arm has a laterally projecting end portion 158 formed at one edge with a pair of spaced upstanding lugs 159. The arm 153 is also formed with an L-shaped branch arm 160 which carries a cam following roller 161 at its outer end. The arm 153 has two operative positions between which it can be moved on the pivot 154, i.e., the advanced position thereof wherein the pressure roller 156 is in engagement with the capstan 13, and the retracted position thereof shown in FIGURES 2 and 3. It will be observed that when the arm 153 is in its retracted position, the drive-out and rewind roller 48 is advanced through the opening 52 in the wall 4 into position for engagement with the leader 38 wound on the periphery of the reel 34 or with said reel itself as shown in FIGURES 2 and 3. Upon advancing movement of the arm 153, the end surface 157 coacts with a roller 55 to pivot the arm 44 and retract the drive-out-rewind roller 48 from the opening 52 in wall 4 to the inoperative position.

Referring to FIGURE 3, an L-shaped crank member 162 is also pivoted on the pin 154 and is formed at the end of one arm thereof with an upstanding lug 163 positioned for engagement with the adjacent edge of the arm 153. A tension spring 164 is connected at one end to the end of the other arm of crank 162, and the other end of said spring is suitably anchored such that said spring biases the crank 162 in a clockwise direction. The slide bar 138 is formed with a downturned lug 165 shown in dotted lines in FIGURE 3, and the spring 164 biases the adjacent arm of the crank 162 into engagement with the lug 165 such that the crank 162 follows the movement of the slide bar 138. Thus, upon retractile movement of the slide bar 138 in response to depression of the stop key 147 the crank 162 pivots to the dot and dash line position thereof shown in FIGURE 3, and if the arm 153 is in advanced position at the time, the lug 163 on said crank arm engages the arm 153 and moves the same to its retracted position shown in FIGURE 3. A tension spring 166 is connected at one end to the upstanding lug 163 on crank 162 and has its other end connected to the branch arm 160 of the arm 153, as at 167. The spring 166 is under continuous tension at all times.

Figure 5:
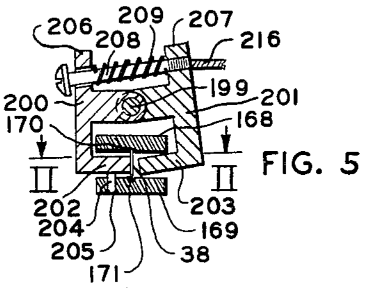
FIGURE 5 is a fragmentary vertical sectional view taken along the line V—V of FIGURE 4.
Figure 7:
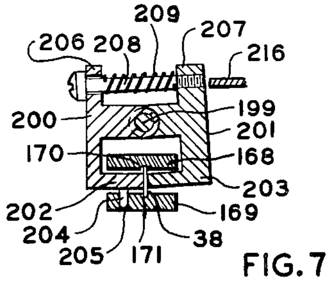
FIGURE 7 is a vertical sectional view taken along the line VII—VII of FIGURE 6.

Referring to FIGURES 2, 5 and 7, a pair of irregularly shaped guide plates 168 and 169 are vertically spaced a distance not substantially greater than the width of the magnetic tape, the inner surfaces of said plates being disposed substantially coplanar with the inner surfaces of the takeup reel flanges 79 and 92. The plates 168 and 169 are formed with straight line rectangular grooves 170 and 171, respectively, said grooves being of sufficient depth to accommodate the opposite edge portions of the leader 38 and being operable to afford a predetermined path for said leader from adjacent the opening 53 in the wall 4 to the opening 102 in the annular guide and deflecting member 100 at the takeup reel 19. The aforementioned leader path passes between the capstan 13 and the pressure roller 156 when the latter is retracted, as best shown in FIGURE 2. Offset from the path afforded by the grooves 170 and 171 a magnetic play-record head 172 and a magnetic erase head 173 are mounted, for example by suspension from a plate 174 fixed on the upper plate 168 as shown in FIGURE 1. As shown in FIGURE 2, a pressure pad member 175 is disposed between the guide plate 168 and 169 and is pivotally mounted at one end on a pin 176, said member carrying a pad 177, for example of felt at its other end. The member 175 carries a pin 178, and a tension spring 179 is connected at one end to the pin 178 and is anchored to a fixed pin 180 at its other end. The spring 179 thus biases the member 175 counterclockwise toward a position with the pad engaging the erase head 173.

The upper and lower guide plates 168 and 169 are formed with registering arcuate slots 181 for accommodation of a pair of spaced vertical pins 182 which depend from the end of an arm member 183 mounted for pivotal movement on the axis of a vertical shaft 184. A spring loaded lost-motion connection is provided between the member 183 and the arm 153 by a shaft 184, torsion spring 188 which surrounds the shaft, and a horizontally directed pin 185 disposed on the shaft 184 between lugs 159 on the arm 153.

When the arm 153 is in its retracted position shown in FIGURE 2, the member 183 is disposed in the position thereof shown in said figure wherein the pins 182 are disposed on opposite sides of the path afforded by the grooves 170 and 171 of the guide plates. When the member 183 is in the position shown in FIGURE 2, the outermost pin 182 engages the pressure pad member 175 to hold the same against the bias of the spring 179 in the retracted position wherein said member and the pad 177 are out of the path of the leader and tape. An overcenter spring 189 has one end connected to the member 183 and has its other end suitably anchored to insure full travel of the member 183 to the position thereof shown in FIGURE 2. Advancing movement of the arm 153, acting through the upstanding lugs 159, pin 185 and torsion spring 188 tends to cause clockwise swinging movement of the member 183 to the position wherein the pins 182 are disposed at the opposite end of the slots 181 to move the tape to a "play" position relative to the heads 172 and 173.

Referring to FIGURES 1 and 2, the member 183 carries an angled bracket 194 having an upstanding apertured flange for receiving a rod 195 which is freely slidable therethrough and has an upturned end portion preventing removal of said rod from said upstanding flange. The opposite end of the rod 195 is connected to a button 196 (FIGURE 1) so that actuation of said button toward the right when the member 183 is in the play position thereof swings the member 183 toward the position thereof shown in FIGURE 2 with actuation of a switch 192 (FIGURE 1) and closure of the contacts thereof during such movement of the member 183.

Figures 4, 6:
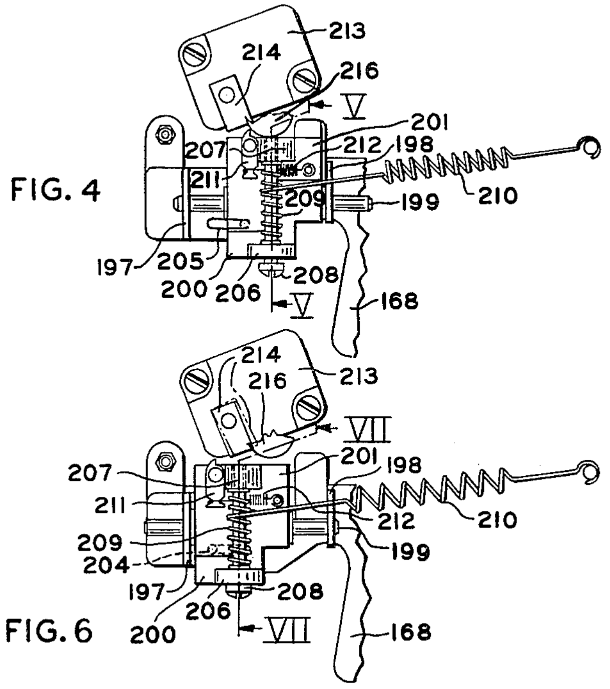
FIGURE 4 is a fragmentary plan view of the mechanism for sensing the completion of a rewind operation, the parts of said mechanism being in the normal positions they assume at all times except during rewinding of the tape and leader.
FIGURE 6 is a fragmentary plan view similar to FIGURE 4 showing the position to which the parts are moved by passage of the leader therethrough during rewinding of the tape and leader.

Referring to FIGURES 1 and 4 to 7, the improved recorder-reproducer includes sensing means operative during a rewind operation to sense the passage of the leader into the cartridge. To this end, a pair of upstanding apertured bracket members 197 and 198 are mounted on the upper guide plate 168 adjacent the wall 4, and a horizontal shaft 199 is axially slidable on said brackets. A pair of cooperating sensing members 200 and 201 are pivotally mounted on the shaft 199 and have inturned jaw portions 202 and 203 disposed between the upper and lower guide plates 168 and 169, said jaw portions terminating in rounded opposing inner edge surfaces shown most clearly in FIGURE 2. The jaw portion 202 carries a depending pin 204 slidable in a slot 205 formed in the lower guide plate 169 and parallel with the shaft 199. The coaction of the pin 204 and slot 205 effects disposition of the inner edge surface of the jaw portion 202 adjacent one side of the guideway provided by the grooves 170 and 171 in the plates 168 and 169 as shown in FIGURES 4 and 7.

The members 200 and 201 are formed on their upper ends with upstanding apertured lugs 206 and 207, and a screw 208 extends loosely through the aperture in the lug 206 and is threaded into the aperture in the lug 207, there being a helical compression spring 209 surrounding the screw 208 and biasing the lugs 206 and 207 apart toward the limit permitted by engagement of the head of the screw 208 with the lug 206. This limit affords a spacing between the opposed edge surfaces of the jaw portion 202 and 203 which is greater than one transverse dimension, for example the thickness, of the tape 37, but is somewhat less than the corresponding transverse dimension, for example the thickness, of the leader 38. When a leader 38 is used is .010 inch thick, a satisfactory minimum spacing between the opposing surfaces of the jaw portions 202 and 203 may be .005 inch. The sensing members 200 and 201, together with the shaft 199 are biased toward the right into engagement with the bracket 198 by a tension spring 210 having one end connected to the screw 208 and having its other end suitably anchored.

The member 201 carries a pivotally mounted sear 211 biased counterclockwise to the position shown in FIGURES 4 and 6 by a light tension spring 212 anchored at one end to said member. The sear 211 is prevented from rotating counterclockwise beyond its position shown in FIGURES 4 and 6 by virtue of its abutment with the lug 207. It can, however, pivot clockwise against the bias of the spring 212. A normally open switch 213 has a swingable actuating arm 214 which is biased to the position thereof shown in solid lines in FIGURES 4 and 6 and is movable counterclockwise from said position to effect closure of the contacts of the switch 213. Movement of the members 200 and 201 toward the left from the position of FIGURE 4 to that of FIGURE 6 moves the sear 211 into engagement with and past the arm 214, said sear being pivoted clockwise by such engagement and then returning to its initial position upon clearing the arm 214. Upon subsequent return movement of members 200 and 201 toward the right to the position of FIGURE 4 causes the sear 211 to engage the switch arm 214 and swing the latter to the dot and dash line position thereof shown in FIGURE 6 as said gear engages and then clears said switch arm without pivotal movement of said sear. Such actuation of the switch arm 214 effects closure of the contacts thereof, and upon the sear clearing said arm, the latter returns to its initial position and the contacts of the switch 213 reopen.

Referring again to FIGURE 1, a generally U-shaped lever 215 is pivotally mounted on the upper end of the shaft 22 and has a rounded end portion 216 positioned for coaction with the upstanding lug 207 of sensing member 201. The other end of the lever 215 carries a depending pin (not shown) to which is connected one end of a tension spring (disposed beneath said other end in FIGURE 1) which has its other end connected to a pin 128 carried by an upstanding arm portion 126 of the member 122. The tension spring biases the lever 215 in a counterclockwise direction tending to move said lever into engagement with the upstanding lug 127. Except during a rewind operation, the tension spring biases the lever 215 to the position shown in FIGURES 1, 4 and 5 wherein the end portion 216 engages the upstanding lug 207 and pivots the member 201 counterclockwise as viewed in FIGURE 5 about the shaft 199 and against the bias of the compression spring 209 to thereby withdraw the inner edge surface of the jaw member 203 from the inner edge surface of the jaw member 202 to provide a gap between said edge surfaces substantially greater than the thickness of the leader 38. Such pivotal movement of the member 201 moves the head of the screw 208 out of engagement with the lug 206 as shown in FIGURES 4 and 5. As will hereinafter appear, during a rewind operation the upstanding lug 127 of the member 122 engages the lever 215 and pivots the latter clockwise to retract the end portion 216 out of engagement with the upstanding lug 207, permitting return of the member 201 to the sensing position of FIGURE 7.

Movement of the lever 122, and of the arm 153 and lever 71 is under the control of cams 219, 220 and 221 which are fixed on a vertical cam shaft 222 and coact respectively with the cam following rollers 125, 161 and 76. The cam shaft 222 is mounted in suitable bearings in the upper and lower decks. The cam 219 affords three positions of the follower 125 and therefore of the lever 122. The innermost position of the follower 125 effects disposition of the lever 122 in the "rewind" position thereof shown in FIGURE 3 with the clutch mechanism for the takeup reel 19 disengaged.

The cam 220 affords two positions for the cam following roller 161 and thereby of the arm 153 carrying pressure roller 156. The inner position of the follower 161 effects disposition of the lever 153 in its advanced position wherein the pressure roller 156 engages the capstan 13. The outermost position of the follower 161 effects disposition of the arm 153 in the retracted position thereof shown in FIGURES 2 and 3.

The cam 221 affords three positions for the cam following roller 76 and therefore of the lever 71. When the follower 76 is in its outermost position, the lever 71 is disposed in the "rewind" position thereof shown in FIGURE 3.

The cartridge storage and changer mechanism 8 provides for the automatic changing of the cartridges 23 upon the tape in the same being "threaded," "played" and "rewound" by the apparatus. The changer mechanism is divided into two compartments or magazines. The magazines are designated as a load magazine 261 and a storage magazine 262 as shown in FIGURE 1. The mechanism 8 is controlled by cams on the stepping cam shaft 222 upon movement thereof in response to completion of the rewinding as indicated by operation of the switch 213 by the novel sensing means.

*Operation*

After the leader 38 is threaded into the apparatus as shown in FIGURE 2, during the automatic cycle, and the tape reaches the capstan 13, the parts shift to the "play" position and the tape is withdrawn from the cartridge 32, past the heads 172 and 173 by the capstan 13 and pressure roller 156 and is wound on the takeup reel 19. The parts of the apparatus remain in the "play" or "record" position until all of the leader and tape have been transported to the takeup reel and the trailer 39 is wound onto the takeup reel. When no more trailer is available for withdrawal from the cartridge or supply reel 34, the pull exerted on the trailer by the coaction of the pressure roller 156 and capstan 13 exerts substantially increased tension on the portion of the trailer extending between the capstan and the hub of the reel 34 to which the trailer 39 is fixed. This increased tension, acts on the pins 182, to pull the member 183 from the "play" position toward the position of FIGURE 2. Switch 192 (FIGURE 1) is actuated during this movement by engagement of the projection 190 on the member 183 with the switch arm 191. This causes the cam shaft 222 to rotate to a position to initiate rewinding of the trailer, tape and leader on the supply reel 34.

The movement of the cam shaft to begin "rewind" moves the follower 125 to its innermost position to thereby move the member 122 to the "rewind" position thereof shown in FIGURE 3 wherein the portion 137 of lever 134 is moved out of engagement with the raised surface portions 131 and 132 of the lever 122 to thereby disengage the clutch on the takeup reel and simultaneously to move the upstanding lug 127 on the member 129 into engagement with the adjacent end of the U-shaped lever 215 (FIGURE 1). Pivoting the lever 215 clockwise retracts the end 216 thereof from the upstanding lug 207 of the sensing member 201 as shown in FIGURES 6 and 7. As shown in FIGURE 7, retraction of the end portion 216 from the lug 207 causes clockwise movement of the member 201 about shaft 199 to bring the inner edge surface of the jaw portion 203 thereof into minimum spaced relation with respect to the inner edge surface of the jaw portion 202 of the member 200.

Movement of the cam 220 to "rewind" position causes movement of the follower 161 to its outer position to cause retractile movement of the arm 153 and pressure roller 156 and simultaneous advancement of the driveout-rewind roller 48 into engagement with the peripheries of the flanges 36 of the reel 34 while at the same time the arm 183 and pins 182 are returned to the positions thereof shown in FIGURE 2.

Rotation of the cam 221 to the "rewind" position moves the follower 76 to its outermost position to thereby pivot the member 71 clockwise to its "rewind" position shown in FIGURE 3, wherein the projection 72 on the member 71 engages the pin 64 and holds the triangular plate 62 rotated counterclockwise against the bias of spring 69 to the position thereof shown in FIGURE 3. Such positioning of the plate 62, acting through the link 66 and spring 68 pulls the rewind idler 61 into engagement with both the motor drive wheel 11 and the advanced driveout-rewind roller 48. The roller 48 is rotated clockwise by the idler 61, and by virture of its engagement with the reel flanges 36, it rotates the reel 34 counterclockwise to effect high speed rewinding of the trailer 39, tape 37 and leader 38 onto said reel. Such rewind, of course, causes counterclockwise rotation of the takeup reel 19 which is free to thus rotate, since the clutch thereof is disengaged.

The rewind operation continues until the leader 38 passes between the jaw portions 202 and 203 of sensing members 200 and 201 and is slidably gripped thereby to cause movement of the sensing members against the bias of spring 210 to the position thereof shown in FIGURE 6. Upon movement of the leader 38 out of engagement with the jaw portions 202 and 203, the sensing members 200 and 201 return to the position thereof shown in FIGURE 4 under the bias of the spring 210, and in so doing actuate the switch 213 by engagement of the pawl 211 with the switch arm 214. Closure of the switch 213 effects the continued rotation of the cam shaft 222.

During the continued rotation of the cam shaft 222 the follower 125 is moved to its outermost postion pivoting the member 122 to its position wherein the portion 131 thereof is moved under the portion 137 of the lever 134 to engage the takeup reel clutch in high torque position. Such movement of the member 122 also withdraws the upstanding lug 127 from the U-shaped lever 215 to permit advancement of the end portion 216 thereof into engagement with the upstanding lug 207 of sensing member 201 for counterclockwise pivotal movement of said lever against the bias of spring 209 to the position thereof shown in FIGURE 5, such movement of the lever 215 being effected by the bias of the tension spring beneath the opposite end of the lever 215.

The continued rotation also moves the follower 161 to its inner position to effect advancing of the member 153 and pressure roller 156 and retractile movement of the drive-out-rewind roller 48. The member 71 is returned to its intermediate position by follower 76 and then the changer mechanism 8 is operative to shift the rewound cartridge 32 to a stored position in magazine 262 and move another cartridge 32 in the load magazine 261 to the "play" position where the automatic cycle of the apparatus is started again.

Having thus described one specific embodiment of the invention, it should be understood that the illustrated embodiment was selected to facilitate the disclosure and is not intended to place unnecessary limitation on the claims or to confine the invention to a particular use. Various changes and modifications may be made in the illustrated embodiment without departing from the spirit of the invention, and all of such changes are contemplated as may come within the scope of the appended claims.

What is claimed is:

1. Means for sensing the travel of an extent of material along a predetermined path comprising a pair of sensing members having opposing sensing surfaces, means mounting said members adjacent said path for movement of the sensing surface of at least one of said members toward and away from the sensing surface of the other member and transversely of said path and for movement of said members as a unit along said path, means biasing said at least one member in the direction to normally position said sensing surfaces closer together than the transverse dimension of an extent of material to be sensed, stop means defining a predetermined first extreme position to which said members can move as a unit along said path and defining a predetermined second extreme position to which said members can move as a unit in the opposite direction along said path, said sensing surfaces being adapted to have sliding frictional engagement with transversely opposite surface portions of a said extent of material moved along said path between said surfaces, said engagement causing movement of said members as a unit with said extent of material toward one of said extreme positions, and control means operatively associated with said members and actuated by movement of said members as a unit toward one of said extreme positions.

2. Means for sensing the travel of an extent of material along a predetermined path comprising a pair of sensing members having opposing sensing surfaces, means mounting said members adjacent said path for movement of the sensing surface of at least one of said members toward and away from the sensing surface of the other member and transversely of said path and for movement of said members as a unit along said path, first biasing means biasing said at least one member toward the other member to normally position said sensing surfaces closer together than the transverse dimension of an extent of material to be sensed, stop means defining a predetermined first extreme position to which said members can move as a unit in one direction along said path and defining a predetermined second extreme position to which said members can move as a unit in the opposite direction along said path, and second biasing means biasing said members as a unit toward said second position, said sensing surfaces being adapted to have sliding frictional engagement with transversely opposite surface portions of a said extent of material moved along said path between said surfaces in said one direction, said engagement causing movement of said members as a unit with said extent of material against the bias of said second biasing means toward said first extreme position, said members being returned as a unit by said second biasing means toward said second extreme position upon continued movement of said material in said one direction out of engagement with said sensing surfaces.

3. A first extent of band material having a predetermined transverse dimension and having attached to one end thereof a second extent of band material having a predetermined corresponding transverse dimension greater than that of said first extent, means for sensing the travel in one direction along a predetermined path of said second extent of band material comprising a pair of sensing members having opposing sensing surfaces, means mounting said members adjacent said path for movement of the sensing surface of at least one of said members toward and away from the sensing surface of the other member transversely of said path and for movement of said members as a unit along said path, means defining a minimum spacing between said sensing surfaces which is greater than said transverse dimension of said first extent to permit free travel of said first extent therebetween along said path and less than the transverse dimension of said second extent, first biasing means biasing said at least one member in the direction tending to produce said minimum spacing between said sensing surfaces, stop means defining a predetermined first extreme position to which said members can move as a unit in said one direction along said path and defining a predetermined second extreme position to which said members can move as a unit in the opposite direction along said path, and second biasing means biasing said members as a unit toward said second position, said sensing surfaces being adapted to have sliding frictional engagement with transversely opposite surface portions of said second extent when the latter is moved along said path between said surfaces in said one direction, said engagement causing movement of said members as a unit with said second extent against the bias of said second biasing means toward said first position, said members being returned toward said second position as a unit by said second biasing means upon movement of said second extent out of engagement with said sensing surfaces.

4. In a machine having a supply reel, a takeup reel, and a rewind drive for said supply reel, the combination of an extent of tape having one end connected to the hub of said supply reel and having a leader of greater transverse dimension than said tape attached to the other end of said tape, means defining a predetermined path for said tape and leader between said reels, means adjacent said supply reel for sensing substantially complete rewinding of said tape and leader from said takeup reel onto said supply reel said sensing means, comprising a pair of sensing members having opposing sensing surfaces, means mounting said members adjacent said path for movement of the sensing surface of at least one of said members toward and away from the sensing surface of the other member transversely of said path and for movement of said members as a unit along said path, first biasing means biasing said at least one member in the direction to normally position said sensing surfaces closer together than the transverse dimension of said leader, stop means defining a predetermined first extreme position to which said members can move as a unit in said one direction along said path and defining a predetermined second extreme position to which said members can move as a unit in the opposite direction along said path, and second biasing means biasing said members as a unit toward said second position, said sensing surfaces being adapted to have sliding frictional engagement with transversely opposite surface portions of said leader when the latter is moved along said path between said surfaces in said one direction during a rewind operation, said engagement causing movement of said members as a unit with said leader against the bias of said second biasing means toward said first position, said members being returned toward said second position as a unit by said second biasing means upon movement of the free end of said leader past and out of engagement with said sensing surfaces towards said supply reel.

5. In a machine having a supply reel, a takeup reel, and a rewind drive for said supply reel, the combination of an extent of tape attached at one end to the hub of said supply reel and having a leader of greater transverse dimension than said tape attached to the other end of said tape, means defining a predetermined path for said tape and leader between said reels, means adjacent said supply reel for sensing substantially complete rewinding of said tape and leader from said takeup onto said supply reel sensing means, comprising a pair of sensing members having opposing sensing surfaces, means mounting said members adjacent said path for movement of the sensing surface of at least one of said members toward and away from the sensing surface of the other member transversely of said path and for movement of said members as a unit along said path, means defining a minimum spacing between said sensing surfaces which is greater than the transverse dimension of said tape to permit free travel of said tape therebetween along said path and less than the transverse dimension of said leader, first biasing means biasing said at least one member in the direction tending to produce said minimum spacing between said sensing surfaces, stop means defining a predetermined first extreme position to which said members can move as a unit in said one direction along said path and defining a predetermined second extreme position to which said members can move as a unit in the opposite direction along said path, second biasing means biasing said members as a unit toward said second position, said sensing surfaces being adapted to have sliding frictional engagement with transversely opposite surface portions of said leader when the latter is moved along said path between said surfaces in said one direction during a rewind operation, said engagement causing movement of said members as a unit with said leader against the bias of said second biasing means toward said first position, said members being returned toward said second position as a unit by said second biasing means upon movement of the free end of said leader past and out of engagement with said sensing surfaces toward said supply reel, control means operatively associated with said members and with said rewind drive, and means for actuating said control means to terminate operation of said rewind drive in response to return movement of said members toward said second position.

6. Means for sensing the travel along a predetermined path of an extent of material having a transverse thickness discontinuity comprising a pair of sensing members opposing sensing surfaces, means mounting said members adjacent said path for movement of the sensing surface of at least one of said members toward and away from the sensing surface of the other member transversely of said path and for movement of said members as a unit along said path, means defining a minimum spacing between said sensing surfaces which is greater than the transverse thickness of one portion of an extent of material to permit free travel of said one portion of said extent therebetween along said path and less than the transverse thickness of said extent at a second portion to be sensed, first biasing means biasing said at least one member in the direction tending to produce said minimum spacing between said sensing surfaces, stop means defining a predetermined first extreme position to which said members can move as a unit in said one direction along said path and defining a predetermined second extreme position to which said members can move as a unit in the opposite direction along said path, second biasing means biasing said members as a unit toward said second position, said sensing surfaces being adapted to have sliding frictional engagement with transversely opposite surfaces of said second portion of a said extent when the latter is moved along said path between said surfaces, said engagement causing movement of said members as a unit with said second portion against the bias of said second biasing means toward said first position, and said members being returned toward said second position as a unit by said second biasing means upon movement of said second portion out of engagement with said sensing surfaces.

No references cited.

MERVIN STEIN, *Primary Examiner.*